United States Patent
Holst et al.

(10) Patent No.: US 9,626,123 B2
(45) Date of Patent: *Apr. 18, 2017

(54) ENSURING HEALTH AND COMPLIANCE OF DEVICES

(71) Applicant: International Business Machines Corporation, Armonk, NY (US)

(72) Inventors: Bent Braum Holst, Alleroed (DK); Nicolai Kildal, Hoerning (DK); Donald C. Laing, Midland, TX (US); Thomas Lindgaard, Ronde (DK); Per Lutkemeyer, Lystrup (DK); Susan K. Schreitmueller, Elon, NC (US); Christian Sonder, Nyborg (DK); Stanley C. Wood, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/240,143

(22) Filed: Aug. 18, 2016

(65) Prior Publication Data

US 2016/0357445 A1    Dec. 8, 2016

Related U.S. Application Data

(63) Continuation of application No. 14/986,902, filed on Jan. 4, 2016, now Pat. No. 9,456,005, which is a
(Continued)

(51) Int. Cl.
*G06F 3/06* (2006.01)
*H04L 29/06* (2006.01)
(Continued)

(52) U.S. Cl.
CPC .............. *G06F 3/065* (2013.01); *G06F 3/067* (2013.01); *G06F 3/0619* (2013.01);
(Continued)

(58) Field of Classification Search
CPC ...... G06F 3/0619; G06F 3/0622; G06F 3/065; G06F 3/067; H04L 41/0668;
(Continued)

(56) References Cited

U.S. PATENT DOCUMENTS 5,797,128 A    8/1998  Birnbaum
7,290,045 B2  10/2007  Mandal
(Continued)

FOREIGN PATENT DOCUMENTS

EP    1805665    7/2007
WO    03054711   7/2003

OTHER PUBLICATIONS

Amendment filed Aug. 17, 2015 in response to Office Action (Mail Date May 18, 2015) for U.S. Appl. No. 13/920,716, filed Jun. 18, 2013.
(Continued)

*Primary Examiner* — Brian J Gillis
*Assistant Examiner* — Gil H. Lee
(74) *Attorney, Agent, or Firm* — Schmeiser, Olsen & Watts; John Pivnichny (57) ABSTRACT

A compliance method and associated system is provided. The method includes generating backup devices for devices of a list of devices associated with a data storage environment. A device from the list of devices is selected and available credentials for connecting and authenticating the device are determined. Configuration and operational state data for the device are retrieved. A backup device associated with the device is selected and associated policies are loaded. Each policy is evaluated with respect to the backup
(Continued)

devices, associated dependencies, and the configuration and operational state data. Compliant and non-compliant policies with respect to the backup devices are determined.

20 Claims, 6 Drawing Sheets

Related U.S. Application Data continuation of application No. 13/920,716, filed on Jun. 18, 2013, now Pat. No. 9,246,752.

(51) Int. Cl.
H04L 12/24 (2006.01)
H04L 12/26 (2006.01)

(52) U.S. Cl.
CPC ........ *G06F 3/0622* (2013.01); *H04L 41/0668* (2013.01); *H04L 43/0817* (2013.01); *H04L 63/08* (2013.01); *H04L 63/10* (2013.01); *H04L 63/20* (2013.01)

(58) Field of Classification Search
CPC ..... H04L 43/0817; H04L 63/08; H04L 63/10; H04L 63/20
See application file for complete search history.

(56) References Cited

U.S. PATENT DOCUMENTS

| | | | |
|---|---|---|---|
| 7,849,368 B2 | 12/2010 | Srivastava et al. | |
| 7,954,014 B2 | 5/2011 | Wang et al. | |
| 8,161,323 B2 | 4/2012 | Kuchibhotla et al. | |
| 8,195,444 B2 | 6/2012 | Brunet et al. | |
| 8,316,197 B1 | 11/2012 | Parker et al. | |
| 8,386,850 B2 | 2/2013 | Riegel et al. | |
| 8,386,855 B2 | 2/2013 | Dake | |
| 8,850,598 B2* | 9/2014 | Pelley | G06Q 10/063 709/201 |
| 9,246,752 B2 | 1/2016 | Holst et al. | |
| 2005/0262168 A1* | 11/2005 | Helliker | G06F 11/1446 |
| 2006/0090200 A1* | 4/2006 | Oie | H04L 29/06 726/7 |
| 2008/0225720 A1* | 9/2008 | Khemani | H04L 29/12594 370/235 |
| 2009/0192818 A1 | 7/2009 | Compton et al. | |
| 2010/0011100 A1 | 1/2010 | Kaneko et al. | |
| 2010/0125897 A1* | 5/2010 | Jain | H04L 63/0272 726/7 |
| 2010/0169279 A1* | 7/2010 | Loi | G06F 11/1464 707/640 |
| 2012/0102543 A1* | 4/2012 | Kohli | H04L 63/20 726/1 |
| 2012/0284571 A1 | 11/2012 | Stanko et al. | |
| 2013/0204450 A1* | 8/2013 | Kagan | H04L 67/06 700/291 |
| 2014/0173733 A1* | 6/2014 | Ford | H04L 63/1416 726/23 |
| 2014/0372556 A1 | 12/2014 | Holst et al. | |
| 2016/0119381 A1 | 4/2016 | Holst et al. | |

OTHER PUBLICATIONS

ManageEngine OpStor; Develcon, Multi-Vendor Storage Area Network (SAN) Management; [retrieved May 22, 2013]; Retrieved form the Internet: URL http://www.develcon.com/nms/opstore.html; 3 pages.

Notice of Allowance (Mail Date Sep. 17, 2015) for U.S. Appl. No. 13/920,716, filed Jun. 18, 2013.

Office Action (Mail Date May 18, 2015) for U.S. Appl. No. 13/920,716, filed Jun. 18, 2013.

Office Action (Mail Date Feb. 23, 2016) for U.S. Appl. No. 14/986,902, filed Jan. 4, 2016.

Amendment filed May 20, 2016 in response to Office Action (Mail Date Feb. 23, 2016) for U.S. Appl. No. 14/986,902, filed Jan. 4, 2016.

Notice of Allowance (Mail Date Jun. 13, 2016) for U.S. Appl. No. 14/986,902, filed Jan. 4, 2016.

\* cited by examiner

ENSURING HEALTH AND COMPLIANCE OF DEVICES

This application is a continuation application claiming priority to Ser. No. 14/986,902 filed Jan. 4, 2016 which is a continuation application claiming priority to Ser. No. 13/920,716 filed Jun. 18, 2013 now U.S. Pat. No. 9,246,752 issued Jan. 26, 2016.

FIELD

One or more embodiments of the invention relates generally to a method and associated system for managing devices, and in particular to a method and associated system for ensuring a health and compliance of devices in a data storage environment.

BACKGROUND

Performing apparatus maintenance typically includes an inaccurate process with little flexibility. Providing an efficient method for inspecting multiple apparatuses may include a complicated process that may be time consuming and require a large amount of resources. Accordingly, there exists a need in the art to overcome at least some of the deficiencies and limitations described herein above.

SUMMARY

A first embodiment of the invention provides a method comprising: generating, by a computer processor, backup devices for devices of a list of devices associated with a data storage environment; selecting, by the computer processor, a first device from the list of devices; determining, by the computer processor, that the first device comprises a supported device; determining, by the computer processor, available credentials for connecting and authenticating the first device; retrieving, by the computer processor, configuration and operational state data associated with the first device; storing, by the computer processor, a snapshot describing the configuration and operational state data; selecting, by the computer processor, a first backup device from the backup devices, the first backup device associated with the first device; loading, by the computer processor, policies associated with the first backup device; evaluating, by the computer processor, each policy of the policies with respect to the backup devices, associated dependencies, and the configuration and operational state data; and determining, by the computer processor based on results of the evaluating, compliant and non-compliant policies of the policies with respect to the backup devices.

A second embodiment of the invention provides a computer program product, comprising a computer readable hardware storage device storing a computer readable program code, the computer readable program code comprising an algorithm that when executed by a computer processor of a computer system implements a method, the method comprising: generating, by the computer processor, backup devices for devices of a list of devices associated with a data storage environment; selecting, by the computer processor, a first device from the list of devices; determining, by the computer processor, that the first device comprises a supported device; determining, by the computer processor, available credentials for connecting and authenticating the first device; retrieving, by the computer processor, configuration and operational state data associated with the first device; storing, by the computer processor, a snapshot describing the configuration and operational state data; selecting, by the computer processor, a first backup device from the backup devices, the first backup device associated with the first device; loading, by the computer processor, policies associated with the first backup device; evaluating, by the computer processor, each policy of the policies with respect to the backup devices, associated dependencies, and the configuration and operational state data; and determining, by the computer processor based on results of the evaluating, compliant and non-compliant policies of the policies with respect to the backup devices.

A third embodiment of the invention provides a computer system comprising a computer processor coupled to a computer-readable memory unit, the memory unit comprising instructions that when executed by the computer processor implements a method comprising: generating, by the computer processor, backup devices for devices of a list of devices associated with a data storage environment; selecting, by the computer processor, a first device from the list of devices; determining, by the computer processor, that the first device comprises a supported device; determining, by the computer processor, available credentials for connecting and authenticating the first device; retrieving, by the computer processor, configuration and operational state data associated with the first device; storing, by the computer processor, a snapshot describing the configuration and operational state data; selecting, by the computer processor, a first backup device from the backup devices, the first backup device associated with the first device; loading, by the computer processor, policies associated with the first backup device; evaluating, by the computer processor, each policy of the policies with respect to the backup devices, associated dependencies, and the configuration and operational state data; and determining, by the computer processor based on results of the evaluating, compliant and non-compliant policies of the policies with respect to the backup devices.

The present invention advantageously provides a simple method and associated system capable of performing apparatus maintenance.

DETAILED DESCRIPTION

Figure 1:
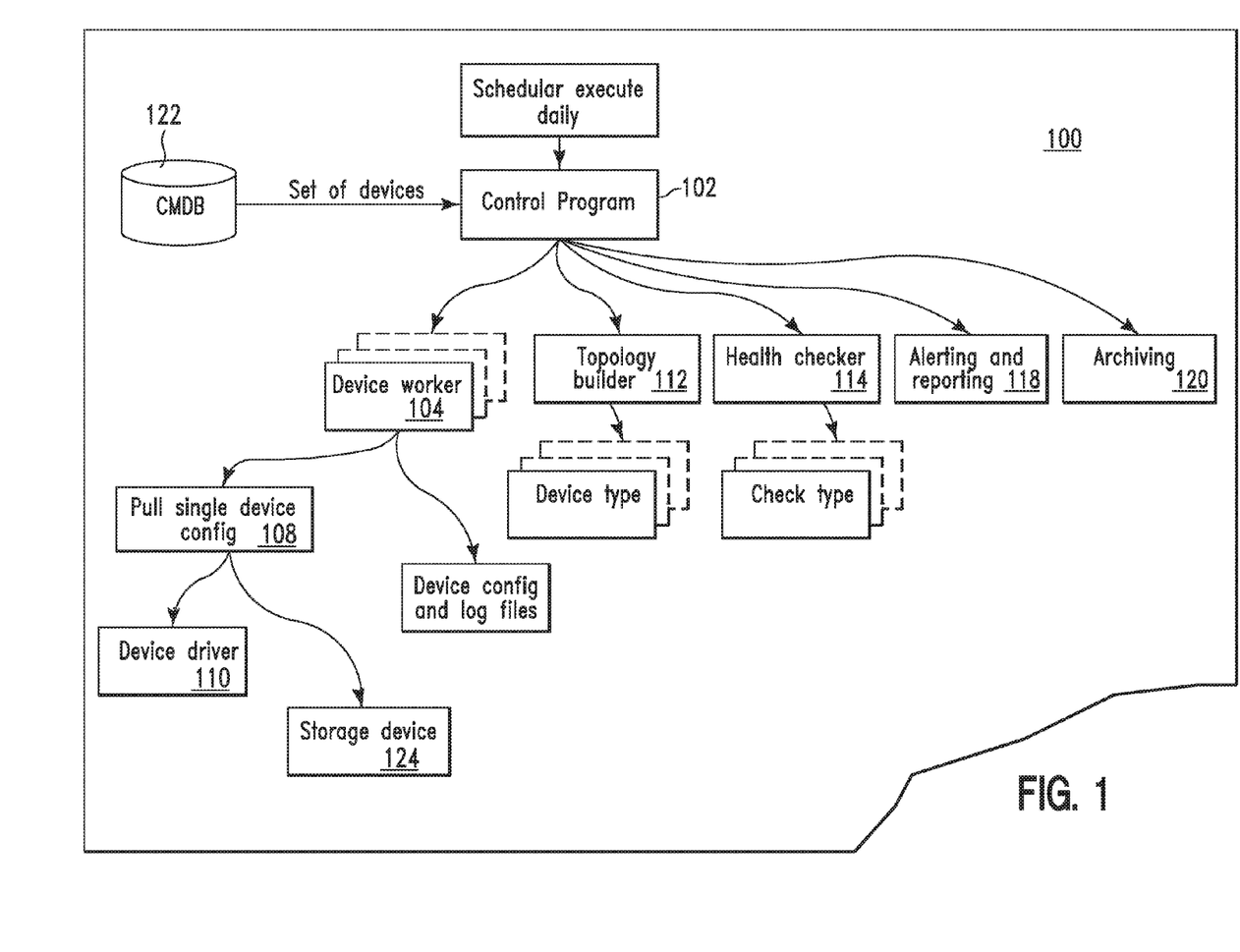
FIG. 1 illustrates a system for enabling a computer system to securely backup a configuration and monitor a health and policy compliance of a storage environment, in accordance with embodiments of the present invention.

FIG. 1 illustrates a system 100 for enabling a computer system to securely backup a configuration and monitor a health and policy compliance of a storage environment, in accordance with embodiments of the present invention. The storage environment may include, inter alia, multiple interconnected storage devices, storage networking devices, and storage clients. System 100 enables a method for determining a health of storage environments by verifying policies for configuration, security, and operational state of storage devices. A configuration comprises a current state of all options able to be set on a device. A device comprises electronic equipment as a part of a storage environment (i.e., by providing storage or connectivity to storage). An operational state includes measurable quantities of a storage device irrespective of configuration (e.g., temperature, fan speed, failed components, errors, remaining capacity, etc). A storage environment may include, inter alia, storage servers including attached arrays of disks, tape drives, solid state storage, storage networking devices (interconnecting additional devices), servers consuming storage, storage virtualization devices, etc. System 100 monitors a health of a storage environment by testing all included devices for compliance with a series of policies including, inter alia, checking device configurations and code levels against best practices, checking device configurations and code levels for compatibility with interconnected devices (i.e., multi-device checks), checking device security policy, checking an operational state of devices, etc. All monitoring information may be collected locally before any policies are evaluated thereby allowing checks to be performed on a wide variety of devices without cooperation from vendors. Additionally, a single policy may cover multiple devices and/or multiple types of devices from different vendors. A policy comprises a logical statement associated with a configuration and/or state of one or more devices that may be evaluated to be true (compliant) or false (noncompliant).

System 100 allows storage administrators to ensure that storage environments are operationally healthy, secure, and configured according to best practices. Additionally, system 100 determines that device configurations and software levels are compatible with each other.

System 100 comprises a control program component 102 and associated configuration management database 122, a device worker component 104, a pull single device configuration component 108, a device driver 110, a topology builder component 112, a health checker component 114, an alerting and reporting component 118, and archiving component 120, and a storage device 124. Control program component 102 comprises a controller for enabling multiple device worker components (e.g., device worker component 104), topology builder component 112, a report generator, and alerting and archiving collected data. Device worker component 104 interacts with a single device (e.g., storage device 124) for collecting data for policy checks. Pull single device configuration component automatically connects to a storage device and retrieves configuration and state information via device driver 110. Device driver 110 interacts directly with storage device 124. Topology builder component 112 builds a map indicating how storage devices are interconnected based on collected configuration and state data. A topology is populated using modules for each device type. Health checker component 114 comprises a policy engine using the collected device configuration data, operational state data, and topology information for evaluating stored policies. Alerting and reporting component 118 generates alerts for high priority findings and transmits health check reports to associated parties. An alert is defined herein as a notification transmitted to a console in an operations center and/or a pager or text messaging device. Archiving component 120 archives health check reports, collected device configurations, state data, and log files. A report includes a comprehensive listing of results of policy evaluations against the backups of known devices.

System 100 enables a computer system to securely backup configuration data and monitor a health and policy compliance of a storage environment comprising multiple interconnected storage devices, storage networking devices, and storage clients as follows:

1. Determining all storage devices are installed in the storage environment and are fully supported.
2. Verifying available credentials for connection and authentication to storage device 124.
3. Retrieving a current configuration and operational state of storage device 124.
4. Storing a snapshot of the current configuration and operational state of storage device 124 for immediate and future checks verifying changes.
5. Selecting backup devices (i.e., a copy of a current configuration and operational state of storage device 124) for storage device 124 and additional storage devices to enable cross device checks as follows:
A. Select each backup device in turn.
B. Load appropriate policies for the each backup device and continue the process until all policies have been evaluated.
C. Select each policy in turn.
D. Evaluate each policy against an associated device backup and any additional dependencies and if the associated device is compliant a next policy is evaluated.
E. Determine if a non-compliant policy comprises a high priority.
F. Generate an immediate alert if the non-compliant policy comprises a high priority.
G. Generate a report after all policies have been evaluated on all supported storage devices.

Figure 2:
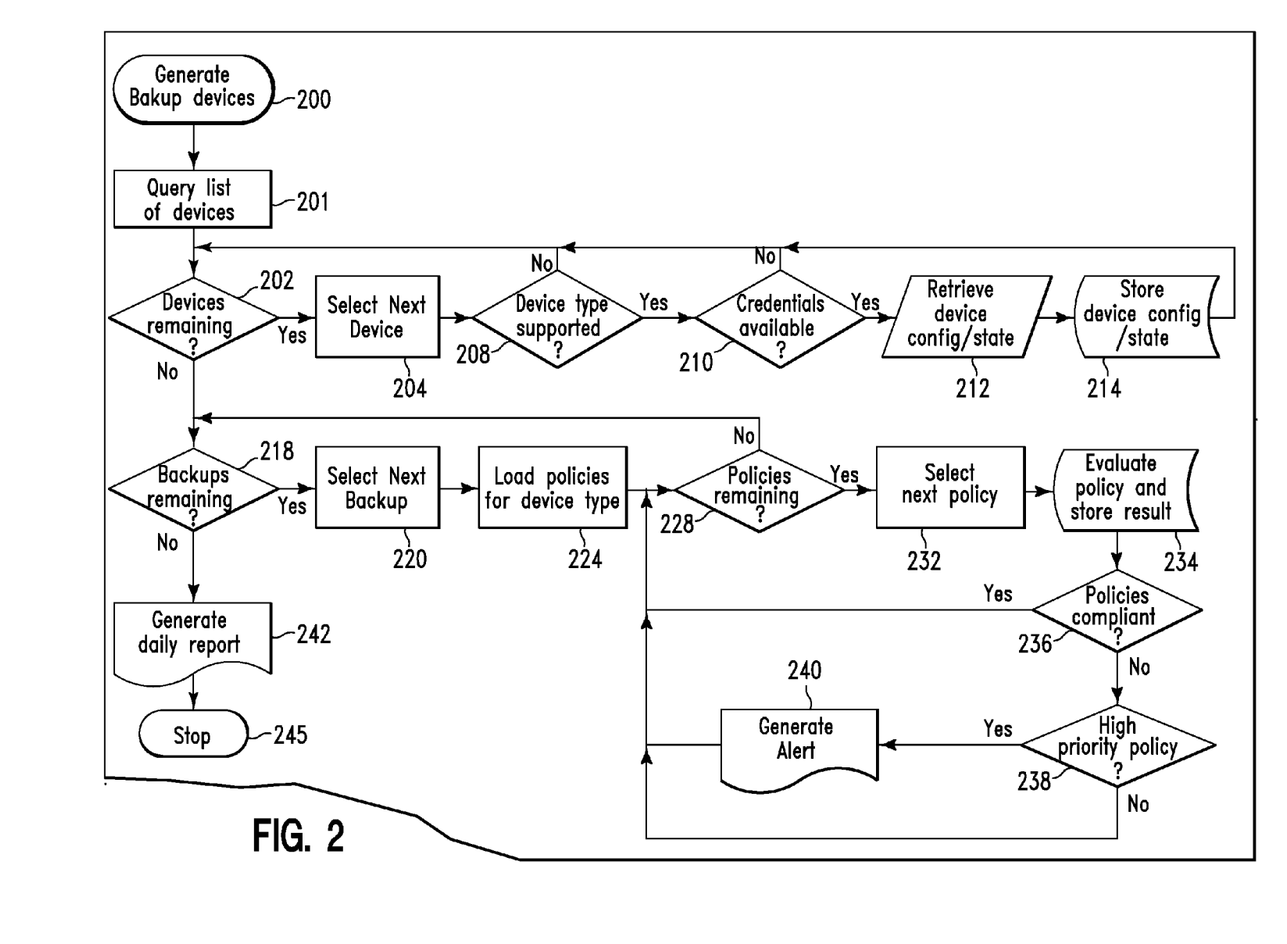
FIG. 2 illustrates an algorithm detailing a process flow enabled by the system of FIG. 1, in accordance with embodiments of the present invention.

FIG. 2 illustrates an algorithm detailing a process flow enabled by the system 100 of FIG. 1, in accordance with embodiments of the present invention. Each of the steps in the algorithm of FIG. 1 may be enabled and executed by a computer processor executing computer code. In step 201, system 100 generates back up (storage) devices associated with (storage) devices of a list of (storage) devices within a storage environment. In step 201, system 100 queries the list of devices. For example, the list of devices maybe provided by control program component 102 and associated database 122 of FIG. 1. In step 202, it is determined if any more devices remain of the list of devices.

If in step 202, it is determined that more devices remain of the list of devices then in step 204 a next device is selected. In step 208, it is determined if a device type is supported. In step 210, it is determined if credentials are available to connect and authenticate to the device. In step 212, a current configuration and operational state of the device is retrieved. In step 214, a snapshot of the current configuration and operational state of the device is stored for immediate and future checks verifying changes. Steps 204-214 are repeated until all devices on the list of devices have been processed.

If in step 202, it is determined that no more devices remain of the list of devices then in step 218, it is determined if any more back up devices (i.e., generated in step 201) remain for processing. For example, after all devices have been backed up, the backup devices are selected one at a time to enable cross device checks. If in step 218, it is determined that more backup devices remain unprocessed then in step 220 a next backup device is selected. In step 224, associated policies for the next backup device are selected until it is determined in step 228 that there are no more remaining associated policies for evaluation. If in step 228, it is determined that there are remaining associated policies for evaluation then in step 232 each policy is selected in turn. In step 234, each policy is evaluated with respect to the backup device and associated dependencies. In step 236, it is determined if the policy is compliant and if so, a next policy is determined in step 228. If the policy is determined to be noncompliant it is determined if the non-compliant policy comprises a high priority policy in step 238 and if so an alert is generated in step 240. In step 242, a report detailing the aforementioned process is generated and the process is terminated in step 245.

Figure 3:
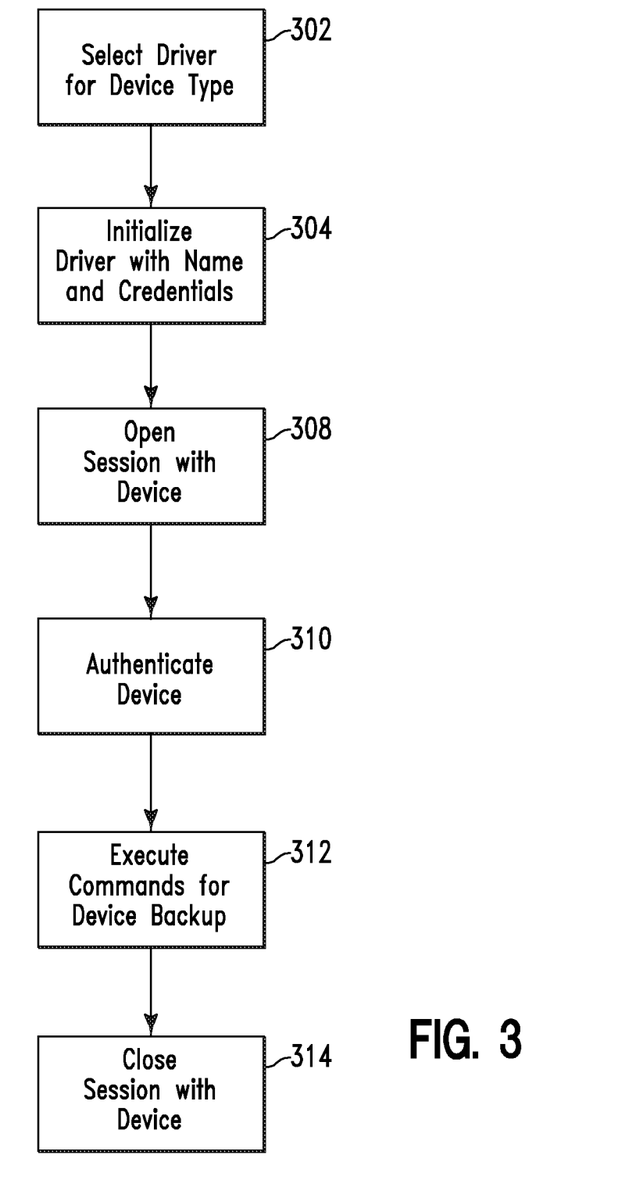
FIG. 3 illustrates an algorithm detailing a step of the algorithm of FIG. 2, in accordance with embodiments of the present invention.

FIG. 3 illustrates an algorithm further detailing step 212 of the algorithm of FIG. 2, in accordance with embodiments of the present invention. In step 302, a device driver associated with a device type of a selected device is selected. In step 304, the driver is initialized with a name and associated credentials. In step 308, a session associated with the selected device is enabled. In step 310, the selected device is authenticated. In step 312, commands associated with an associated backup device are executed. In step 314, the session is disabled.

Figure 4:
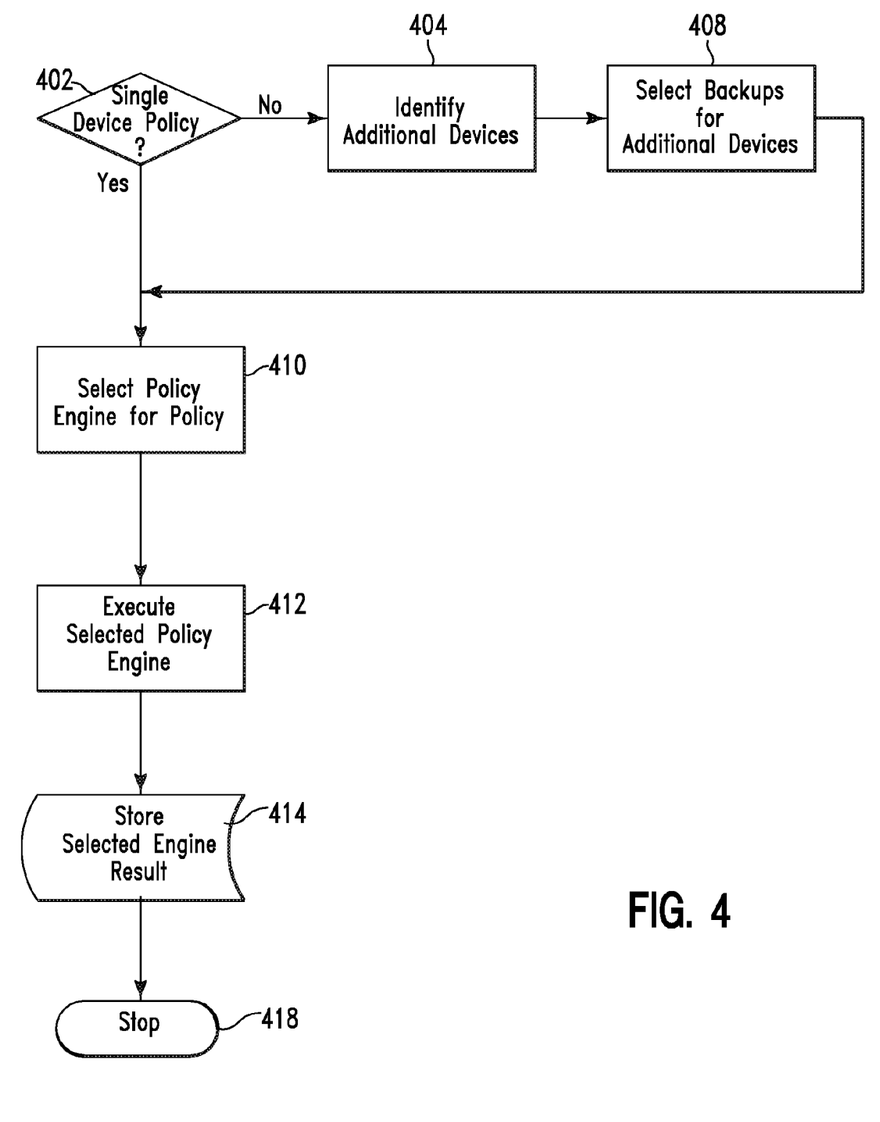
FIG. 4 illustrates an algorithm further detailing a step of the algorithm of FIG. 2, in accordance with embodiments of the present invention.

FIG. 4 illustrates an algorithm further detailing step 234 of the algorithm of FIG. 2, in accordance with embodiments of the present invention. In step 402, it is determined if a selected policy comprises a single device policy. If in step 402, it is determined that a selected policy comprises a single device policy then step 410 is executed as described, infra. If in step 402, it is determined that a selected policy does not comprise a single device policy then in step 404, additional devices for the selected policy are identified. In step 408, associated backup devices for the additional devices are selected.

In step 410, a policy engine is selected for each policy. In step 412, each selected policy engine is executed. In step 414, results of step 412 are stored and the process is terminated in step 418.

Figure 5:
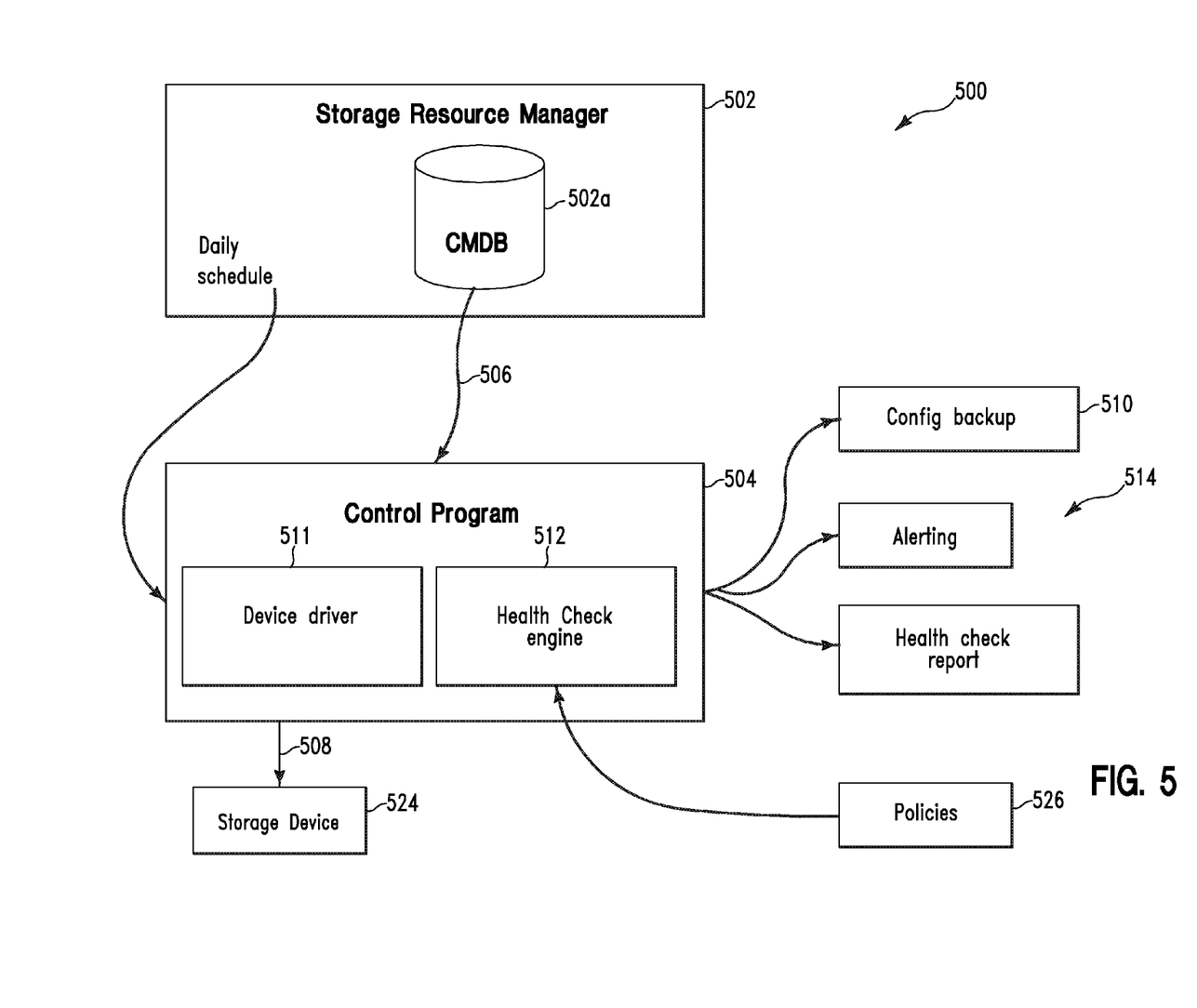
FIG. 5 illustrates an alternative system to the system of FIG. 1, in accordance with embodiments of the present invention.

FIG. 5 illustrates an alternative system 500 to system 100 of FIG. 1, in accordance with embodiments of the present invention. System 500 comprises a control program 504 connected between a storage resource manager 502 and a storage device 524. Storage resource manager 502 generates an inventory report and initializes control program 504. Control program 504 retrieves a subsystem inventory list from storage resource manager 502 via link 506. Device driver 511 connects to storage device 524 and retrieves configuration settings via link 508. Configuration backup component 510 archives configuration settings and operational states on a disk (e.g., configuration backup). Health check engine 512 compares a configuration from each storage device 524 comprising one or more policies 526. Alerting and health check report component 514 generate an alert and report results.

Figure 6:
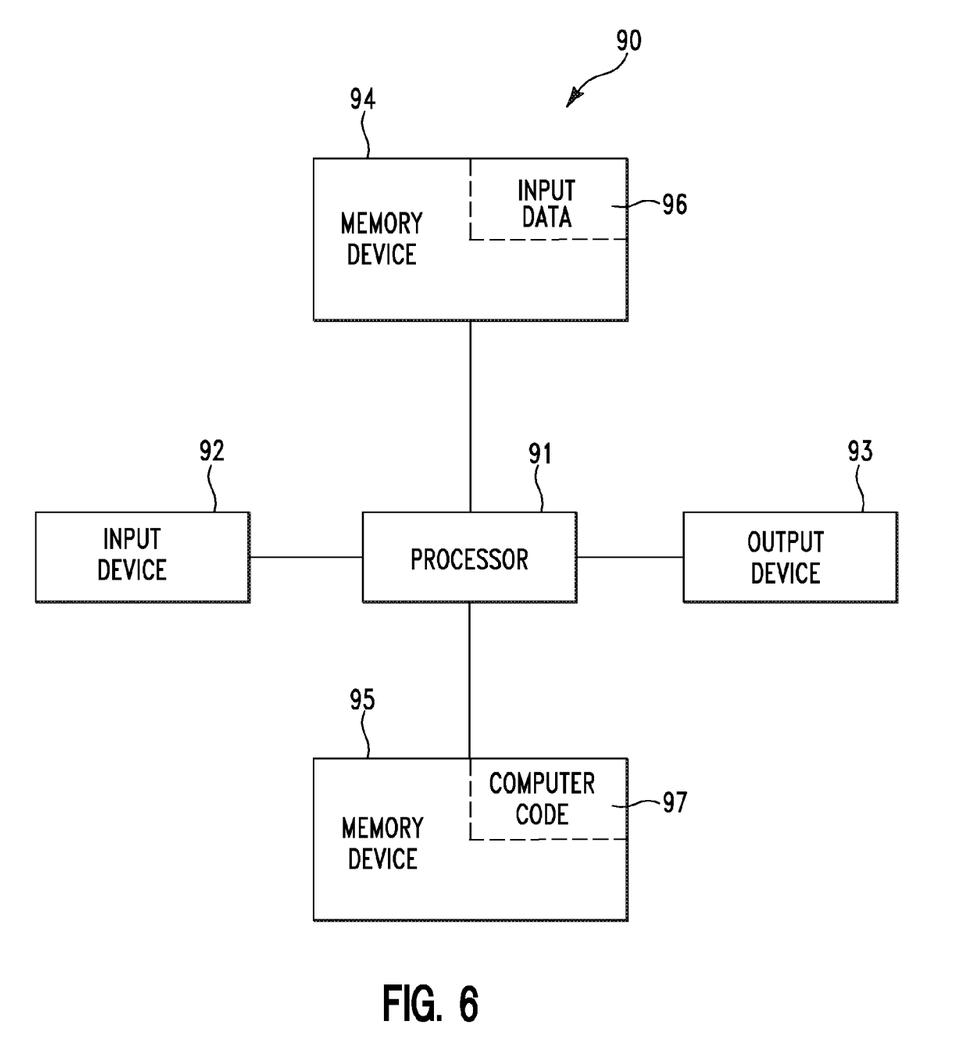
FIG. 6 illustrates a computer apparatus used by the systems and processes of FIGS. 1-5 to securely backup a configuration and monitor a health and policy compliance of a storage environment, in accordance with embodiments of the present invention.

FIG. 6 illustrates a computer apparatus 90 used by the systems and processes of FIGS. 1-5 for securely backing-up a configuration and monitoring the health and policy compliance of a storage environment, in accordance with embodiments of the present invention. The computer system 90 includes a processor 91 (or processors in computer systems with multiple processor architecture), an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2-4) for securely backing-up a configuration and monitoring the health and policy compliance of a storage environment. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may include the algorithm of FIGS. 2-4 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

Still yet, any of the components of the present invention could be created, integrated, hosted, maintained, deployed, managed, serviced, etc. by a service supplier who offers to securely back-up a configuration and monitor the health and policy compliance of a storage environment. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for securely backing-up a configuration and monitoring the health and policy compliance of a storage environment. In another embodiment, the invention provides a business method that performs the process steps of the invention on a subscription, advertising, and/or fee basis. That is, a service supplier, such as a SOLUTION INTEGRATOR, could offer to securely back-up a configuration and monitor the health and policy compliance of a storage environment. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method comprising:
generating, by a computer processor, backup devices for devices of a list of devices associated with a data storage environment;
determining, by said computer processor, available credentials for connecting and authenticating a first device from said list of devices, wherein said first device comprises a supported device;
retrieving, by said computer processor, configuration and operational state data associated with said first device, wherein said configuration and operational state data comprises measurable operational quantities associated with a state of said first device, and wherein said configuration and operational state data comprises configurations independent from said measurable operational quantities of said first device;
storing, by said computer processor, a snapshot describing said configuration and operational state data, said snapshot configured to enable immediate and future checks verifying changes to said first device;
generating, by said computer processor based on results of analyzing said snapshot, a map indicating interconnections between said devices;
selecting, by said computer processor, a first backup device from said backup devices, said first backup device associated with said first device, wherein said first backup device comprises a current configuration and operational state for said first device, wherein said current configuration and operational state is retrieved from said configuration and operational state data, wherein said operational state comprises measurable quantities of said first device irrespective of said current configuration, and wherein said measurable quantities comprise a fan speed quantity, a failed component quantity, error quantities, and a remaining storage capacity quantity;
evaluating, by said computer processor, each policy of policies associated with said first backup device with respect to said backup devices, associated dependencies, and said configuration and operational state data;
determining, by said computer processor based on results of said evaluating, compliant and non-compliant policies of said policies with respect to said backup devices;
generating, by said computer processor, an alert indicating a high priority policy of said compliant and non-compliant policies; and
transmitting, by said computer processor, said alert to a console in an operations center or a pager or text messaging device.

2. The method of claim 1, wherein results of said determining compliant and non-compliant policies indicate at least one non-compliant policy with respect to said first backup device, and wherein said method further comprises:
determining, by said computer processor, that said at least one non-compliant policy comprises said high priority policy; and
generating, by said computer processor, a report indicating said results of said determining said compliant and non-compliant policies of said policies with respect to said first backup device.

3. The method of claim 2, further comprising:
determining, by said computer processor based on said results of said determining said compliant and non-compliant policies, an overall health of said data storage environment.

4. The method of claim 2, further comprising:
determining, by said computer processor, security policies associated with said first backup device, wherein said determining is further based on said evaluating security policies.

5. The method of claim 1, further comprising:
querying, by said computer processor, said list of devices.

6. The method of claim 1, further comprising:
receiving, by said computer processor, said list of devices.

7. The method of claim 1, wherein said retrieving said configuration and operational state data comprises:
selecting a driver associated with a device type of said first device;
initializing said driver with a name and associated credentials;
enabling a session associated with said first device;
authenticating said first device;
executing commands associated with said first backup device; and
disabling said session.

8. The method of claim 1, wherein said evaluating each said policy comprises:
first determining if any policy of said policies comprises a single device policy associated with only said first backup device.

9. The method of claim 8, wherein results of said first determining indicate that a first policy is only associated with first backup device, and wherein said evaluating each said policy further comprises:
selecting a policy engine for said first policy;
executing said policy engine; and
storing a result of said executing.

10. The method of claim 8, wherein results of said first determining indicate that a first policy is associated with multiple backup devices of said backup devices, and wherein said evaluating each said policy further comprises:
identifying said multiple backup devices; and
selecting said multiple backup devices as additional devices.

11. The method of claim 1, further comprising:
providing at least one support service for at least one of creating, integrating, hosting, maintaining, and deploying computer-readable code in said computer processor, said code being executed by the computer processor to implement said generating, said determining said available credentials, said retrieving, said storing, said generating said map, said selecting said first backup device, said evaluating, said determining said compliant and non-compliant policies, said generating said alert, and said transmitting.

12. A computer program product, comprising a computer readable hardware storage device storing a computer readable program code, said computer readable program code comprising an algorithm that when executed by a computer processor of a computer system implements a method, said method comprising:
generating, by said computer processor, backup devices for devices of a list of devices associated with a data storage environment;
determining, by said computer processor, available credentials for connecting and authenticating a first device from said list of devices, wherein said first device comprises a supported device;
retrieving, by said computer processor, configuration and operational state data associated with said first device, wherein said configuration and operational state data comprises measurable operational quantities associated with a state of said first device, and wherein said configuration and operational state data comprises configurations independent from said measurable operational quantities of said first device;

storing, by said computer processor, a snapshot describing said configuration and operational state data, said snapshot configured to enable immediate and future checks verifying changes to said first device;

generating, by said computer processor based on results of analyzing said snapshot, a map indicating interconnections between said devices;

selecting, by said computer processor, a first backup device from said backup devices, said first backup device associated with said first device, wherein said first backup device comprises a current configuration and operational state for said first device, wherein said current configuration and operational state is retrieved from said configuration and operational state data, wherein said operational state comprises measurable quantities of said first device irrespective of said current configuration, and wherein said measurable quantities comprise a fan speed quantity, a failed component quantity, error quantities, and a remaining storage capacity quantity;

evaluating, by said computer processor, each policy of policies associated with said first backup device with respect to said backup devices, associated dependencies, and said configuration and operational state data;

determining, by said computer processor based on results of said evaluating, compliant and non-compliant policies of said policies with respect to said backup devices;

generating, by said computer processor, an alert indicating a high priority policy of said compliant and non-compliant policies; and transmitting, by said computer processor, said alert to a console in an operations center or a pager or text messaging device.

13. The computer program product of claim 12, wherein results of said determining compliant and non-compliant policies indicate at least one non-compliant policy with respect to said first backup device, and wherein said method further comprises:

determining, by said computer processor, that said at least one non-compliant policy comprises said high priority policy; and generating, by said computer processor, a report indicating said results of said determining said compliant and non-compliant policies of said policies with respect to said first backup device.

14. The computer program product of claim 13, wherein said method further comprises:

determining, by said computer processor based on said results of said determining said compliant and non-compliant policies, an overall health of said data storage environment.

15. The computer program product of claim 13, wherein said method further comprises:

determining, by said computer processor, security policies associated with said first backup device, wherein said determining is further based on said evaluating security policies.

16. The computer program product of claim 12, wherein said method further comprises:

querying, by said computer processor, said list of devices.

17. The computer program product of claim 12, wherein said method further comprises:

receiving, by said computer processor, said list of devices.

18. The computer program product of claim 12, wherein said retrieving said configuration and operational state data comprises:

selecting a driver associated with a device type of said first device;

initializing said driver with a name and associated credentials;

enabling a session associated with said first device;

authenticating said first device;

executing commands associated with said first backup device; and disabling said session.

19. The computer program product of claim 12, wherein said evaluating each said policy comprises:

first determining if any policy of said policies comprises a single device policy associated with only said first backup device.

20. A computer system comprising a computer processor coupled to a computer-readable memory unit, said memory unit comprising instructions that when executed by the computer processor implements a method comprising:

generating, by said computer processor, backup devices for devices of a list of devices associated with a data storage environment;

determining, by said computer processor, available credentials for connecting and authenticating a first device from said list of devices, wherein said first device comprises a supported device;

retrieving, by said computer processor, configuration and operational state data associated with said first device, wherein said configuration and operational state data comprises measurable operational quantities associated with a state of said first device, and wherein said configuration and operational state data comprises configurations independent from said measurable operational quantities of said first device;

storing, by said computer processor, a snapshot describing said configuration and operational state data, said snapshot configured to enable immediate and future checks verifying changes to said first device;

generating, by said computer processor based on results of analyzing said snapshot, a map indicating interconnections between said devices;

selecting, by said computer processor, a first backup device from said backup devices, said first backup device associated with said first device, wherein said first backup device comprises a current configuration and operational state for said first device, wherein said current configuration and operational state is retrieved from said configuration and operational state data, wherein said operational state comprises measurable quantities of said first device irrespective of said current configuration, and wherein said measurable quantities comprise a fan speed quantity, a failed component quantity, error quantities, and a remaining storage capacity quantity;

evaluating, by said computer processor, each policy of policies associated with said first backup device with respect to said backup devices, associated dependencies, and said configuration and operational state data;

determining, by said computer processor based on results of said evaluating, compliant and non-compliant policies of said policies with respect to said backup devices;

generating, by said computer processor, an alert indicating a high priority policy of said compliant and non-compliant policies; and transmitting, by said computer processor, said alert to a console in an operations center or a pager or text messaging device.

\* \* \* \* \*